Oct. 25, 1938.   W. H. BROOKS   2,134,026

METHOD OF MAKING BREAD STICKS

Filed May 23, 1936   2 Sheets-Sheet 1

INVENTOR.
William H. Brooks,

BY  Chas. E. Townsend.
ATTORNEY.

Oct. 25, 1938.  W. H. BROOKS  2,134,026

METHOD OF MAKING BREAD STICKS

Filed May 23, 1936  2 Sheets-Sheet 2

INVENTOR.
William H. Brooks.
BY
Chas. E. Townsend.
ATTORNEY.

Patented Oct. 25, 1938

2,134,026

UNITED STATES PATENT OFFICE 2,134,026

METHOD OF MAKING BREAD STICKS

William H. Brooks, Fairfax, Calif.

Application May 23, 1936, Serial No. 81,422

2 Claims. (Cl. 99—90)

This invention relates to baked or toasted bread in the form of sticks and to a method of making same.

Bread, as sold at the present time, is usually sliced and wrapped and is a food product whose keeping qualities are very poor, as after a day, or at the most two, the bread becomes too dry and is known as "stale bread".

While a small quantity of stale bread may be sold at a reduced price the bulk of it is returned to the bakeries and sold for poultry or hog feed at a price so low that the percentage of loss to the bakeries is considerable.

The present method contemplates a method of converting the standard sliced bread of commerce into toasted bread sticks, or into sticks which are flavored with a filler, such as cheese, sesame seeds, etc. More specifically stated, the invention consists in applying an edible flavoring agent or filler on one slice of bread, placing another on top thereof, placing the two slices of bread between heated plates having elongated grooves formed therein to mold the bread in accordance with the shape of the grooved plates, and subjecting the bread to the heat of the plates for a sufficient length of time to bake or toast the bread and then removing the bread and breaking it apart to form bread sticks.

A method and apparatus whereby this may be accomplished is described in the accompanying specification and by way of illustration is shown in the accompanying drawings, in which—

Figure 3:
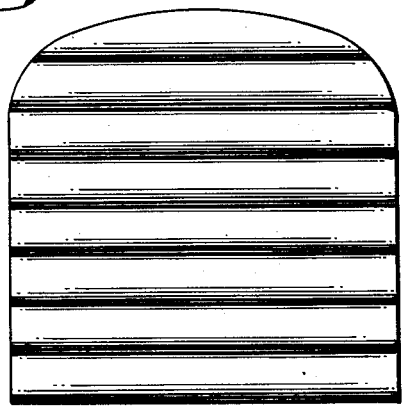
Figure 4:
Figure 5:
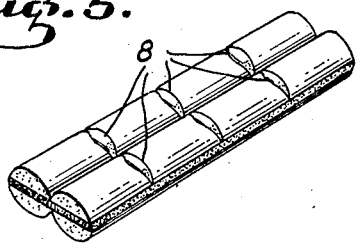
Figure 6:
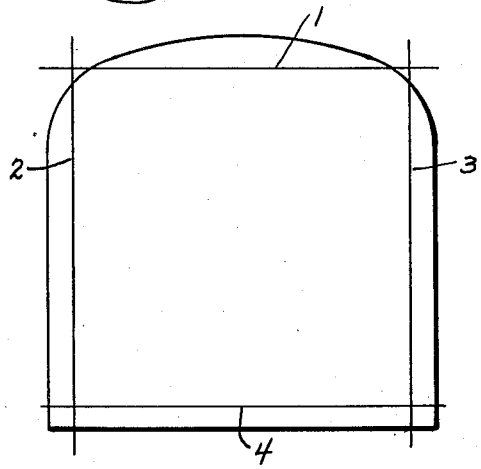
Figure 7:
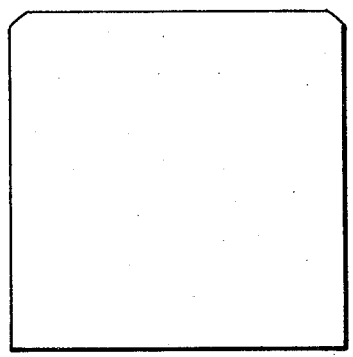
Figure 8:
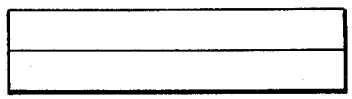
Figure 9:
Figure 10:
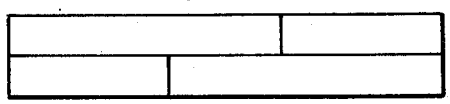
Figure 11:
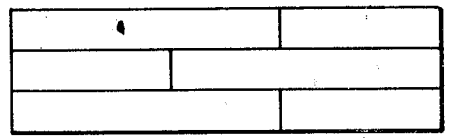

Fig. 3 is a plan view of a finished product before broken apart;

Fig. 4 is an end view of the same;

Fig. 5 is a perspective view showing a modified form of the product;

Fig. 6 shows a manner in which the bread slices are trimmed or cut to remove the exterior crust;

Fig. 7 is a plan view showing a bread slice when trimmed;

Fig. 8 diagrammatically illustrates the manner in which two bread slices are placed on top of each other prior to compression and toasting;

Fig. 9 is an end view of the completed product;

Fig. 10 is a diagrammatic view showing two layers or slices of different length placed with the adjoining edges staggered so that a long bread stick may be formed therefrom;

Fig. 11 shows a manner of forming a bread stick from three layers of bread slices.

The bread slices are first trimmed or cut, as shown by the lines 1, 2, 3 and 4 in Fig. 6, to remove the outer crust and when trimmed will have the shape shown in Fig. 7. The bread stick to be formed is substantially round in cross section and is approximately one-half inch in diameter.

Figure 1:
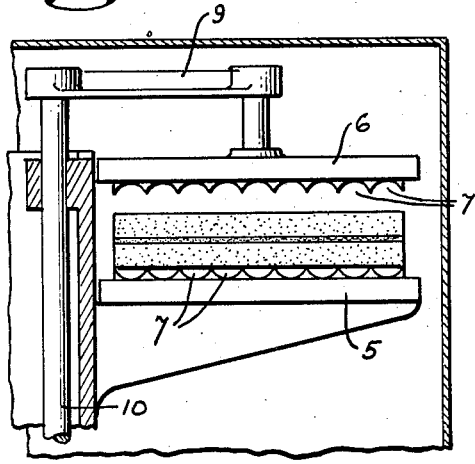
Fig. 1 is a diagrammatic view of the baking or toasting oven and the plates between which the bread slices are compressed and toasted, said view showing the compression and toasting plates separated.

To make a bread stick of this diameter, it is preferable to use two slices of bread, each being about one-half inch in thickness as this is the standard thickness of the bread slices. The slices are placed one on top of the other and then placed between a pair of heated plates 5 and 6, see Fig. 1. The slices are here subjected to heat and compression sufficient to cause them to adhere together and to take the shape of the grooves 7 formed in the surfaces of the plates. The slices remain between the plates sufficiently long to enable them to become thoroughly toasted and partly or wholly dextrinized, after which the plates are separated and the toasted stick removed.

The grooves formed in the plates are substantially semi-circular in shape and extend from end to end of the plates, hence when bread slices are placed between the plates, compressed and subjected to heat for a sufficient length of time the slices when removed will present a unitary structure of the shape shown in Figs. 3 and 4; that is, the plates will form the bread slices into a series of connected bread sticks which may be marketed in that form or broken apart into separate sticks.

To facilitate the breaking of the stick into small sections by the consumer, ribs may be formed on the toasting plates so as to form notches in the sticks such as shown at 8 in Fig. 5. Small pieces of this character make very fine croutons for soup, etc.

To make certain that the bread slices will adhere at all times a starch paste may be made of any suitable starch (such as corn, potato, or flour) which is sprayed on very lightly. Egg whites, or any similar edible adhesive material, can also be used for this purpose.

To make a bread stick containing a suitable filling the same procedure is used, except that after spraying with the starch paste, the filler consisting of toasted sesame seeds, cheese, spices, ground nuts, etc., is sprinkled on the paste and the other slice placed on top. When compression between the plates is applied to the extent of fifty percent, or more, as in the case of plain bread slices, no adhesive material is required. In addition to the above, the sticks can be flavored with any dry material, such materials being salt, sugar, all kinds of spices.

The bread sticks can also be treated after toasting by spraying them with a liquid edible solution, such as a solution made of gum arabic and water and then the salt, toasted seeds, or any other material may be sprinkled over the solution before the solution dries.

If the bread is compressed fifty percent, or more, no adhesive material is necessary between the slices when two of them are placed one on top of the other, as there is usually enough moisture left in the bread to bind the slices together.

In view of the fact that the average bread slice from a one pound loaf measures about four by four inches, the length of the finished stick would be only four inches. However, one and one-half pound loaves are also used and these produce a longer slice, hence by combining long and short slices of bread and staggering them as shown in Fig. 10 sticks of any desired length can be obtained. Similarly, it is possible to place the bread slices in three layers, as shown in Fig. 11.

The bread slices or sticks should be toasted and dextrinized at low temperature from about 375° F. to 400° F. for about five to five and one-half minutes. This applies to sticks formed from two slices of bread. If three slices are placed on top of each other a slightly longer time is required.

When a bread stick is made from three slices of bread, the top and bottom slices may consist of white, graham or rye, or the like, and the third or center slice may be highly seasoned, spiced or fruit bread slices. The center slice may also be taken from cheese bread, cinnamon bread, raisin bread, etc. In the case of raisin bread, the raisin slice being in the center the fruit is protected from direct contact with the heated plates which would otherwise tend to burn the raisins. Another example of a three slice bread stick would be rye bread on top and bottom and a highly seasoned cheese bread slice in the center.

Figure 2:
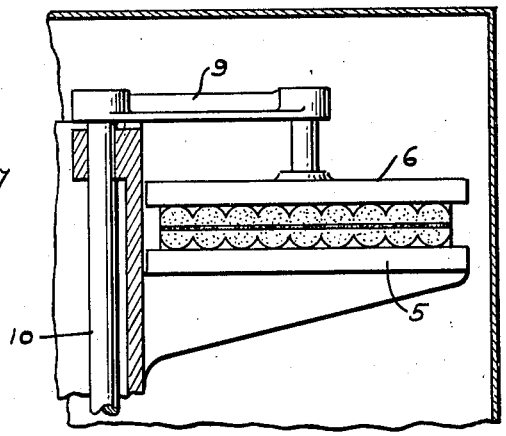
Fig. 2 is a similar view showing the bread slices under compression between the plates.

The type of toasting machine employed is that illustrated in an application filed by Leon V. Rebois, February 5, 1936, Serial Number 62,492, entitled "Toasting machine". For this reason diagrammatic illustration of the toasting plates is thought sufficient. Suffice it to say, that one of the toasting plates, for instance that indicated at 5, is stationary, while the other plate, indicated at 6, is secured to an arm 9 carried by a rod 10. This rod will be raised and lowered at timed intervals and functions first of all to separate the plates and maintain them separated while a finished product is being removed and new slices being replaced, thereafter the plate 6 is lowered and pressure is applied to mold the bread into the shape shown in Fig. 2, these operations being entirely automatic as clearly described in the application referred to.

The product obtained by this toasting operation may be sold in the form shown in Figs. 3, 4 and 5, or it may be broken apart into separate sticks as desired. By notching the sticks, as shown in Fig. 5, the sticks may, in turn, be broken into short lengths. The product may be composed of bread only or it may be composed of bread with a filler or flavoring material in it; that is, the flavoring material may be placed between the two slices of bread, or it may be applied to the exterior as described, and while these and other features of the invention have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. A method of forming sticks from sliced bread which consists in placing a plurality of slices, one on top of the other, with the entire surfaces of the opposed faces of the slices contacting, placing the slices between grooved heated plates, applying sufficient pressure to the slices to cause the edges and the entire area of contact of the slices to weld together and to be pressed into and conform to the shape of the grooves of the plates by a pressure which will not destroy the porous structure of the bread, leaving the compressed slices between the plates until toasted, and then separating the plates and removing the toasted slices.

2. A method of forming long bread sticks from sliced bread which consists in placing a series of slices in row formation, placing a second series of slices on top thereof with the entire surfaces of the opposed faces of the slices contacting and staggering said second row of slices with relation to the first row to cause the slices of the second row to overlie the contiguous edges of the adjoining slices of the first row, placing the slices between grooved heated plates, applying sufficient pressure to the slices to cause the edges and the entire contacting surfaces of the slices to weld together and to be pressed into and conform to the shape of the grooves in the plates by a pressure which will not destroy the porous structure of the bread, leaving the compressed slices between the plates until toasted, separating the plates and removing the toasted slices, and then breaking the toast apart to form individual long bread sticks.

WILLIAM H. BROOKS.